Patented Aug. 11, 1942

2,292,624

UNITED STATES PATENT OFFICE 2,292,624

FERTILIZER BLOOD AS A GLUE BASE

William Dawes Fawthrop, Seattle, Wash., assignor to Adhesive Products Company, Seattle, Wash., a corporation of Washington No Drawing. Application January 3, 1940, Serial No. 312,292

4 Claims. (Cl. 106—161)

This invention is concerned with the use of fertilizer blood and equivalent material as a glue base.

In my prior patent, 2,164,269, issued June 27, 1939, I disclosed a method of using fish meal as a base for water resistant adhesives by effecting complete dispersion or solution of the particles of fine ground meal in a cold or preferably hot aqueous alkaline medium, with an additional treatment with a metallic salt such as zinc-chloride to obtain water resistance. By further research I have now devised a new general method of using insoluble or difficultly soluble high protein-content animal meals of fertilizer grade and materials of equivalent character. This method has great advantages and does not require either the step of dissolving the particles or the subsequent treatment with a special metallic salt, both of which were essential steps in my prior process. I also avoid any necessity for using heat in preparing the glue. Furthermore, the present process is not restricted to fish meal but is applicable to blood meals which constitute still more widely available materials of much greater usefulness.

I have now made the important discovery that the common cheap insoluble blood meal (the so-called fertilizer blood) which results from heat coagulating, pressing, and high temperature drying of fresh animal blood by the usual packing house method and is at present sold exclusively for fertilizer at about three and one-half cents per pound, may be readily used as a principal adhesive of a high grade glue base as a substitute for and in combination with the costly soluble dried blood albumen which costs about ten cents per pound. Furthermore, I find that this cheap, insoluble material when properly used, not only serves as an effective substitute for the costly soluble material but has certain valuable new properties. Its use is also free from troublesome features which characterize the soluble variety.

Hitherto, as far as I can discover, the insoluble fertilizer grade of blood meal has never been used as an adhesive base; in fact, it has always been regarded as having had its adhesive properties destroyed by the heat used in its manufacture. This view is confirmed by the fact that, in order to make animal blood a material useful as an adhesive, it has hitherto been necessary to process and dry the blood at great expense under carefully controlled conditions which would preserve its water solubility. Dried soluble blood sold as soluble blood albumen has nevertheless been in great demand as an adhesive base, principally because, after it has been dissolved and made into a spreadable glue and then coagulated by heat, it become exceedingly insoluble and consequently produces glue bonds of remarkable water resistance. Since the water resistance of such glue bonds is generally developed by heat coagulation, it has been natural to consider the fertilizer grade of blood meal which has already been heat coagulated, as useless for adhesive purposes and hence the present discovery that instead of being useless, it is an exceedingly useful material for that purpose, is an unexpected development of great importance.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

I first discovered that by suspending fertilizer blood in water adding a high concentration of strong alkali, (for example, adding about 20% of caustic soda) and then strongly heating or boiling the mixture for about twenty to thirty minutes, it was possible by such drastic treatment to eventually dissolve the blood and upon cooling have a spreadable, dispersed glue and that this glue could be successfully used to join plywood by the usual hot press method. While I am thus able to obtain strong glue bonds having substantial water resistance, the results are not entirely equal to those obtained with soluble blood albumen and there is evidence both of injury to the adhesive properties by the drastic treatment with heat and alkali and also the method of making the glue proves to be slow and troublesome. By the foregoing gluing method I dissolve the particles of fertilizer blood and produce a glue from which substantially all the suspended particles have disappeared, but in order to accomplish that result, I have to use both heat and a large amount of powerful alkali so that the material appears to be somewhat injured by hydrolysis.

By further research I have found a way of avoiding both of these objections and am now able to make an even more effective glue by suspending preferably a major quantity of fine insoluble particles of fertilizer blood in a dispersion of a minor i. e., a lesser amount of water soluble blood albumen effective to form a bond with the fertilizer blood and I am able to obtain fully effective adhesive action from the fertilizer blood without having either to use heat in making up the glue or resort to alkalinity beyond that which is customary in making ordinary dispersed proteinous adhesives. This unexpectedly successful result with a refractory material generally considered to be insoluble is derived from my discovery that ordinary alkalinity is effective to soften and swell the insoluble material without destroying the discrete particles and is effective to disperse the soluble blood albumen. In this softened and swollen condition I find these particles are capable of serving as an effective adhesive without any need for bringing them into solution. As a matter of fact it appears probable that they never became more than softened and somewhat plastic under the conditions of my process. At any rate they can readily be observed by the microscope in the final glue bond in which they still appear as discrete particles surrounded by and embedded in a cement of the dried and solidified dispersed phase of the glue mixture.

When using this preferred or discrete particle method, the final bond strength and water resistance seems to be controlled to an important extent by the properties of the dispersed phase or carrier element, so that if soluble blood is used for that purpose, the entire complex gives the high strength and water resistance of these materials, while if, for example, a somewhat lower grade material such as soybean flour is used as the carrier, then the water resistance drops to the level characteristic of that material and so on according to the particular glue base chosen as the carrier. The result of this procedure seems to be that the dispersed phase as it is dried down during the formation of the bond welds itself to the surfaces of the softened fertilizer blood particles, whenever they are not in sufficiently close mutual contact to be able to weld to each other directly, and thus the carrier serves to link the particles together with a bond having the strength and properties of this dispersed linkage or cement. The dispersed phase performs the further function of holding the particles in suspension and imparting the necessary viscosity required for proper spreading, while the dispersing agents, usually alkalies, at the same time both disperse the soluble material and attack and soften the surfaces of the insoluble blood particles.

It is understood, of course, that a mere suspension of such insoluble particles in water and alkali alone, is decidedly deficient in the desirable combination of fluidity and viscosity required for convenient spreading. However, such a suspension is not impossible to spread and I have found that the carrier element may be omitted and commercial adhesion and water resistance can be obtained when using this suspension as a glue, provided there is some alkalinity present such as will cause the particles to swell and soften. That they do actually swell and soften seems to be proved by the fact that when alkali is added to the suspension a thickening occurs, and furthermore, the fact that adhesion is obtained without the presence of any carrier whatever, demonstrates that the particles are softened sufficiently to be able to weld to each other. I believe, however, that little or no solution of the fertilizer blood occurs in my process because when a suspension of fertilizer blood with the alkalinity which I ordinarily use is filtered, the filtrate comes out almost entirely clear and colorless, and, of course, it would be dark and highly colored if the blood was dissolved to any appreciable extent. However, in order to obtain a high degree of adhesion and fully satisfactory spreadability, I prefer to use a soluble adhesive carrier made by dispersing such proteinous materials as soluble blood albumen, soybean flour or the like, or a mixture of such materials.

In any of these gluing processes I prefer to grind the fertilizer blood or similar material as fine as is conveniently possible, a desirable degree of fineness being reached when all the material passes through a one hundred mesh screen with 80% or more passing a two hundred mesh screen. Since the adhesive properties in the present use are developed mostly on the particle surfaces, the great increase in available surface resulting from fine grinding makes the material more effective. When using a carrier there is a wide range of permissible proportions between the dispersible and undispersible elements, the fertilizer blood being used in an amount effective to constitute a principal adhesive. Ordinarily I prefer to use between 45 and 85% of fertilizer blood and make up the balance in dispersible protein material. It is, therefore, seen that a great economy results because high grade adhesive bases such as soluble blood albumen cost several times as much as the fertilizer blood and yet the full properties of these expensive high grade materials are obtained in the glue bond notwithstanding the presence of usually a major proportion of the cheap material.

Fertilizer blood used in this way has other important advantages besides reduction in cost. Due to its insoluble character it has a low water requirement or ability to absorb water and this avoids the troublesome high water content which is a decidedly objectionable feature of ordinary soluble blood albumen. It is thus possible to make up glues that have a desirably high percentage of solids. A further advantage is that the fertilizer blood is almost entirely free from the tendency to cause foaming which is a troublesome feature of soluble blood. Another advantage is that the presence of the suspended particles greatly improves spreadability as compared to glues consisting wholly of dispersed material.

By this method I am thus able to make low cost glues in which the bond is composed of fertilizer blood and soluble blood albumen having the properties of expensive ones and can thus produce a variety of adhesives suitable for both cold process and hot process use in the extensive field of plywood manufacture as well as joining porous materials in general and for other uses to which such adhesives are adapted. The greatest economic advantage, of course, is obtained when using a major proportion of the fertilizer blood with a high grade glue base as a carrier. Under these conditions a small amount, even as little as fifteen per cent of high grade material, does the work which formerly required a large quantity. The result follows the law that a chain is as strong as its weakest link. In the present instance the fertilizer blood particles are strong, tough, and insoluble, so that the glue bond resulting from welding them together in a cement of set or hardened dispersed adhesive is either weak or strong according to the inherent character of the linkage material, provided, of course, the latter is able to adhere securely to the insoluble particles. Thus, with a strong highly water resistant linkage material, such as soluble blood albumen, a strong water resistant bond is the result.

On the question of available materials, while fertilizer blood appears to combine features which make it especially useful in my process, equivalent combinations of essential properties are found in some other substances. The requirement calls for a material which in the form of a powder provides strong, tough, water resistant particles which do not dissolve in an aqueous, alkaline medium practical for glues but nevertheless become swollen and softened in such a medium and thus are rendered capable of bonding to each other or to a suitable dispersed adhesive. Materials having this combination of properties are usable in my process and are equivalent to fertilizer blood for the purposes of the present invention. The most available alternate material is fish meal as described in my previous patent, No. 2,164,269. When using fish meal in the present process, I do not, of course, dissolve the particles, but only soften and swell them. Another material of this character, although I have not yet been able to test it, is probably a powder formed by reducing casein plastics or scrap from casein plastics which have been hardened and made insoluble by the customary formaldehyde treatment. Another material which I have tested and found effective is a phenolic molding powder which had aged until it had become so extensively polymerized as to be useless for its original purpose but was still capable of attack by alkali. Probably, also, various protein materials rendered insoluble by heat or chemical treatment would at some stage reach a condition meeting this requirement. At present, however, the principal materials which are cheap enough to be widely useful seem to be the fertilizer meals such as blood meal and fish meal.

It is seen that the gluing action described depends upon the use of a medium usually an alkali which both disperses the carrier and softens the suspended particles. The alkalies and combinations of alkalies commonly used in making proteinous glues produce this condition without any need for the use of heat in making the glue. Such alkalinity, for example, is commonly obtained by using between 4% and 12%, based on the dry weight of the adhesive base, of caustic soda or equivalent alkaline salts producing a pH at least as alkaline as pH 10.75 and generally about 11.5. The resulting adhesive also is capable of setting up by either cold process or hot process methods. In some instances other reagents capable of simultaneously softening the suspended particles and dissolving the dispersed adhesive may have an action equivalent to that of the alkalies which I commonly use for this purpose. In other words, it is only necessary that the reagent be capable of swelling but not dispersing the particular fine ground condensation product which is employed and, simultaneously, capable of dispersing another material which is adequate to serve as a carrier. For example, alcohols, acetone, or phenols may be used as solvents with certain condensation products. There is thus a wide tolerance both in the formulation, gluing process and applicability of my new adhesives. I find that excellent results may be produced on both hard and soft woods as well as other materials for which adhesives of this character are commonly used. It is thus seen that the present invention is of extremely wide application, for by selecting for the dispersed phase adhesive base materials or combinations having special properties, glue chemists can readily formulate glues of this character by following the usual methods and make up glues suitable for a wide range of materials to be glued and operating conditions to be met. It is also seen that, since as little as 15% of the dry material in the form of dispersible adhesive is required to produce a proper spreading consistency and the amount of insoluble suspended particles may be varied within wide limits, it is possible to produce glues of low or high solid content, without being limited by the water requirement of the dispersed phase as would be the case if no suspended material were present. This is of value particularly when the hot process is being employed in making plywood, since glues of high solid content are normally much more quick-setting than glues which contain a large amount of water.

My invention will now be illustrated by several typical examples:

*Example 1*

A dry powdered glue base was mixed as follows by weight:

|  | Per cent |
| --- | --- |
| Fertilizer blood | 53 |
| Soluble blood albumen | 30 |
| Casein | 10 |
| Sodium fluoride | 2 |
| Disodium phosphate (anhydrous) | 3 |
| Pine oil | 2 |
|  | 100 |

100 parts of the above mixture were made up into a glue at room temperature with 320 parts of water adding as reagents during the mixing, 12 parts of hydrated lime, 6 parts of caustic soda, and 25 parts of "N" brand silicate of soda. The glue had the usual viscosity and was of good spreading consistency. Three-ply fir panels of $\frac{1}{16}$" plies were hot pressed for three minutes at 200 lbs. per square inch hydraulic pressure with the press heated to 240° F. Panels with a short assembly time, or "T. A.," of one minute gave very strong, highly water resistant bonds, as did similar panels pressed after a ten minute time of assembly. Shear test results were as follows:

|  | Dry shear strength | Wood failure | Wet shear strength | Wood failure |
| --- | --- | --- | --- | --- |
|  | Pounds | Percent | Pounds | Percent |
| 1 min. T. A | 353 | 97 | 254 | 68 |
| 10 min. T. A | 343 | 95 | 236 | 64 |

Similar results were obtained on hard woods such as birch. A similar dry glue base was made up without any casein and containing 64% fertilizer blood, 30% soluble blood albumen, and the same reagents. This glue gave a slightly lower water requirement to reach the same viscosity and similar results except that the wet wood failure was even higher. Another glue using soybean flour as the dispersible element in place of blood albumen and casein, gave equivalent dry strength, but the water resistance dropped as shown by a wet shear of 182 lbs. with no wood failure. Another glue was made up substituting 53% of a fertilizer grade of fish meal in place of the fertilizer blood, the other materials and reagents being the same as in the first formula. The water requirement rose to 3.84 to 1 but both dry and wet shears were of a high order although the wet wood failure was much lower than with fertilizer blood. The shear results were:

|  | Dry shear strength | Wood failure | Wet shear strength | Wood failure |
|---|---|---|---|---|
|  | Pounds | Percent | Pounds | Percent |
| 1 min. T. A. | 296 | 74 | 194 | 3 |
| 10 min. T. A. | 308 | 85 | 195 | 18 |

The higher water requirement was due to greater swelling of the fish meal, which, however, remained undissolved.

*Example 2*

A dry powdered glue base was mixed as follows by weight:

| | Per cent |
|---|---|
| Fertilizer blood | 73 |
| Hydrated lime | 15 |
| Trisodium phosphate | 8 |
| Sodium fluoride | 4 |
| | 100 |

100 parts of the above glue base were mixed with 225 parts of water and stirred for thirty minutes in a steam jacketed mixer and then cooled rapidly to room temperature by running cooling water through the jacket of the mixer. The result was a completely dissolved glue of the correct viscosity and fair spreading properties. Fir panels were made up the same as in Example 1, but were hot pressed for six minutes with the press heated to 280° F. after times of assembly of 10 minutes and 20 minutes respectively. The shear test results were as follows:

|  | Dry shear strength | Wood failure | Wet shear strength | Wood failure |
|---|---|---|---|---|
|  | Pounds | Percent | Pounds | Percent |
| 10 min. T. A. | 277 | 70 | 124 | 0 |
| 20 min. T. A. | 335 | 95 | 114 | 0 |

This glue gave good commercial results from the standpoint of dry strength, but had an odor of ammonia indicating considerable hydrolysis, which is confirmed by the low wet shear results. However, this is a very inexpensive glue as regards cost of materials. The high alkalinity in the form of caustic soda obtained by double decomposition between the lime and the other salts was necessary along with the strong heating in order to dissolve the very refractory fertilizer blood particles.

*Example 3*

A dry powdered glue base was mixed as follows by weight:

| | Per cent |
|---|---|
| Phenol resin | 55 |
| Soluble blood albumen | 30 |
| Casein | 10 |
| Disodium phosphate | 3 |
| Sodium fluoride | 2 |
| | 100 |

100 parts of the above mixture were made up into a glue at room temperature with 276 parts of water and the same reagents as in Example 1. This glue behaved similarly to the glue of Example 1 and was tested on the same wood and with the same treatment except that no long time of assembly panels were made.

The test result gave a dry shear of 271 lbs. with 62% wood failure and wet shear of 205 lbs. with 18% wood failure. The phenol resin used was an old sample of molding powder that had deteriorated by self-polymerization until it was no longer useful for molding, but on test it was found to soften and swell somewhat in water with 6% caustic soda, although it would not dissolve in any concentration of caustic soda without strong heating.

*Example 4*

A glue similar to Example 1, but with 46% fertilizer blood, 35% soluble blood albumen and 12% casein was made up for comparative test on fir plywood when used alternatively in both the hot process and cold process. The same conditions as in Example 1 were used for the hot pressing and the customary cold process conditions usual for fir plywood manufacture were used for making the cold pressed panels. The usual spreads were used of about 18 lbs. dry material per 1000 square feet of three-ply panels for the hot process and 25 lbs. for the cold process.

Hot process results were as follows:

|  | Dry shear strength | Wood failure | Wet shear strength | Wood failure |
|---|---|---|---|---|
|  | Pounds | Percent | Pounds | Percent |
| 5 min. T. A. | 269 | 99 | 218 | 63 |

Cold process results were:

|  | Dry shear strength | Wood failure | Wet shear strength | Wood failure |
|---|---|---|---|---|
|  | Pounds | Percent | Pounds | Percent |
| 5 min. T. A. | 268 | 99 | 176 | 29 |
| 20 min. T. A. | 268 | 99 | 163 | 9 |

It is noted that while from the standpoint of dry strength, the hot and cold processes gave almost identical results, the wet strength of the panels made by the hot process was decidedly superior notwithstanding that the amount of glue used in the cold process is about 40% greater. This example illustrates that, while glues of this type can readily be formulated for either pressing method, the most outstanding results are obtained when the hot process is employed.

Other modes of applying the principle of the invention may be employed, change being made as regards the details described, provided the features stated in any of the following claims, or the equivalent of such, be employed.

I claim:

1. A dry glue comprising as its major adhesive constituent fertilizer blood, a lesser amount of water soluble blood albumen effective to impart high water resistance and form with the fertilizer blood a bond, and an alkali in amount effective to soften and swell the fertilizer blood and disperse the soluble blood albumen when the same are wetted with water.

2. A glue comprising an aqueous alkali dispersion carrying in suspension undissolved alkali softened and swollen particles of fertilizer blood as the major protein constituent, a lesser amount of a water soluble blood albumen dispersed in said aqueous carrier and effective to impart high water resistance and form with the fertilizer blood a bond, and an alkali in amount effective to soften and swell the fertilizer blood and disperse the said soluble blood albumen in the dispersion.

3. The process of gluing which comprises interposing between surfaces to be united a glue comprising an aqueous dispersion carrying in suspension undissolved alkali softened and swollen particles of fertilizer blood as the major protein constituent, a lesser amount of water soluble blood albumen dispersed in said aqueous carrier and effective to impart high water resistance and form with the fertilizer blood a bond, and an alkali in amount effective to soften and swell the fertilizer blood and disperse the said soluble blood albumen in the dispersion and hot pressing the assembly and hardening the adhesive for uniting said surfaces.

4. The process of gluing which comprises interposing between the surfaces to be united a viscous adhesive comprising an aqueous alkali dispersion carrying in suspension undissolved alkali softened and swelled adhesive particles of fertilizer blood and carrying in dispersion water soluble blood albumen, said fertilizer blood being present in so substantial an amount as to be effective to constitute a principal adhesive and said water soluble blood albumen being present in amount effective to impart high water resistance and form with the fertilizer blood adhesive a bond for uniting the surfaces, and an alkali in amount effective to soften and swell the fertilizer blood adhesive and disperse the blood albumen, and hot pressing the assembly and hardening the adhesive for uniting the said surfaces.

WILLIAM DAWES FAWTHROP.